UNITED STATES PATENT OFFICE.

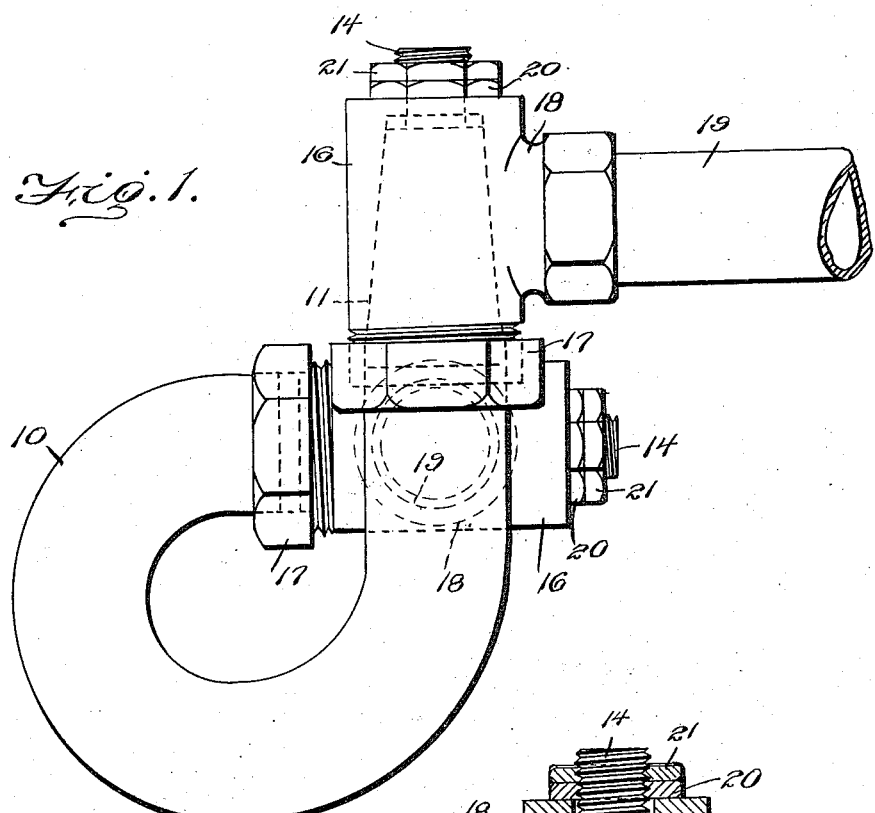
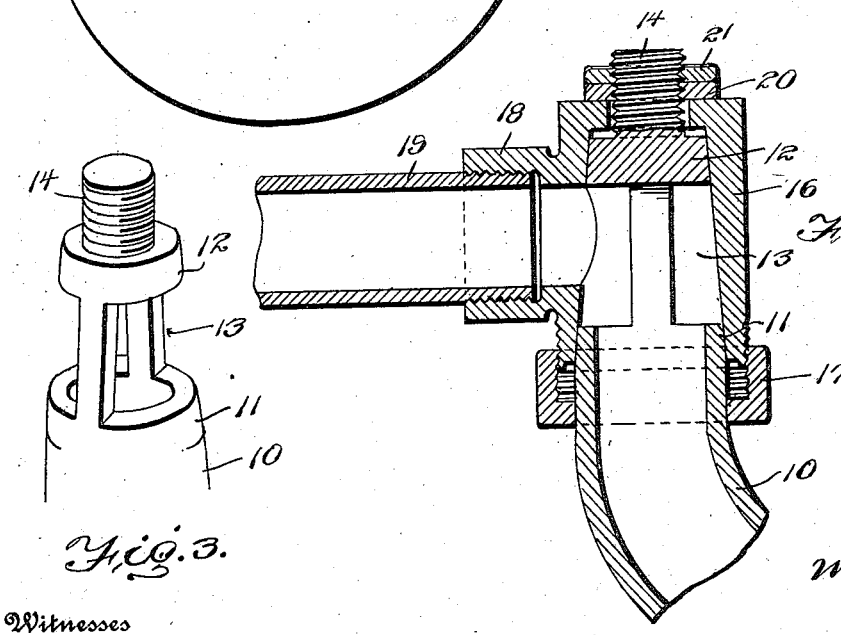

WESLEY CHRISTY, OF PITTSBURG, KANSAS.

PIPE-JOINT.

1,069,674. Specification of Letters Patent. Patented Aug. 12, 1913.

Application filed January 30, 1912. Serial No. 674,309.

*To all whom it may concern:*

Be it known that I, WESLEY CHRISTY, citizen of the United States, residing at Pittsburg, in the county of Crawford and State of Kansas, have invented certain new and useful Improvements in Pipe-Joints, of which the following is a specification.

This invention relates to an improvement in pipe joints.

The primary object of the present invention is to provide a flexible connection between conduits whereby the conduits may move with respect to each other, the joint being steam tight regardless of the movement of the conductors which are connected thereto.

Another object of the invention is to provide a joint which may be readily applied to pipes of various sizes or to specially constructed parts as may be preferred.

Another object of the invention is to provide a joint wherein the wearing of the parts may be readily "taken up" without disconnecting the parts and thereby maintaining the steam or water-tight condition.

With these and other objects in view, the invention consists in certain novel features of construction as hereafter shown and described and then specifically pointed out in the claims.

The coupling may be employed in connection with various constructions and may be used with steam, gas, or water pipes, the device being illustrated in the present drawings as used in its double capacity—that is, arranged to couple pipes extending at different relative angles.

Figure 1 is a side elevation of the improved device applied to a curved elbow with one of the devices connected between each end of the elbow pipe and the conductor pipes leading therefrom; Fig. 2 is a sectional view of the improved device applied to a single elbow. Fig. 3 is a perspective view of the body member.

Corresponding and like parts are referred to in the following description and indicated in all the views of the accompanying drawing by the same reference characters.

The improved device comprises an elbow pipe 10 externally tapered at one end as represented at 11 with the smaller terminal closed as shown at 12, and with lateral openings 13 in the tapered portion of the elbow. A threaded stud 14 extends from the smaller end of the tapered portion 11 of the elbow to receive jam nuts as hereafter shown.

The elbow member Fig. 1 is represented with both ends tapered and provided with the lateral openings 13, while in Fig. 2 the elbow is provided at one end only with the tapered portion, and adapted to be connected at the other end directly to the conductor pipe. Either of these arrangements may be employed in connection with the improved device.

Engaging over the tapered portion 11 of the elbow is an internally tapered shell on sleeve 16 having an opening at one end to fit relatively close over the threaded stud 14 and externally threaded at the other end to receive a packing nut 17 which insures a steam water or air-tight joint between the elbow 10 and the shell or sleeve at the larger end of the tapered portion of the elbow. A threaded pipe-receiving boss 18 extends from one side of the shell or sleeve 16 to receive a conductor pipe 19, the conductor pipe thus communicating with the interior of the elbow through the opening 13.

A clamp nut 20 and a jam nut 21 engage over the stud 14 and bear against the outer end of the shell or sleeve and thus hold the shell or sleeve in close engagement with the tapered portion of the elbow.

The tapered portion 11 of the elbow and the tapered interior of the shell or sleeve are ground steam gas or water-tight whereby leakage will be effectually prevented.

The apertures 13 are of considerably greater length than the interior diameter of the pipe-receiving boss 18 so that in event of the wear of the joint and the necessary adjustment to retain the joint in steam or air-tight condition, the passages through the device will not be reduced by any adjustment which may be found necessary.

It will be noted that by adjusting the nut 17 the shell 16 may be moved with respect to the tubular member. That is, with the nut 17 resting upon the shell and at the limit of its downward movement on the tubular member, the rotation of the nut in either direction will feed the shell vertically. Thus a wrench may be applied to the nut and the shell drawn down through the pressure exerted on the nut as the same is rotated. When the nut is rotated in the other direction the shell will be fed upward to unseat the tubular member. When the shell has been adjusted by means of the nut, the jam nuts 20 and 21 are rotated to lock the shell in its adjusted position.

The improved joint is simple in construction, can be inexpensively manufactured, and permits free movement between the parts while at the same time retaining the steam gas or air-tight condition.

The couplings are adjusted before the same are attached to the conduits of the locomotive, this being necessary owing to slight variations which may occur in the relative dimensions of the tubular member and shell, the shell being readily adjusted on the tubular member prior to its being coupled to the pipes of the locomotive. The couplings may thus be shipped without any care being taken as to the adjustment of the parts, the adjustment being accomplished at the time the devices are attached. It will also be seen that after the devices are attached the parts may be adjusted to compensate for wear by the adjustment of the jam nuts arranged on the threaded extension of the tubular member.

Having thus described the invention, what is claimed as new is:

1. A pipe coupling including a tubular tapered member, an interiorly tapered shell, said tubular member being provided with an extension, a member arranged at one end of the shell for imparting vertical movement to the shell, means for limiting the movement of said member in one direction, and means arranged at the other end of the shell on the extension of the tubular member for locking the shell against movement.

2. A pipe coupling including a tubular member, a shell receiving said member, said tubular member being provided with a threaded extension disposed to extend through an opening in the shell, a nut threaded on the lower terminal of the shell and embracing the tubular member, said tubular member being curved to limit the movement of the nut in one direction, the nut when rotated imparting vertical movement to the shell, and a jam nut arranged on the threaded extension of the tubular member and disposed to contact with the shell to lock the shell against movement.

In testimony whereof, I affix my signature in presence of two witnesses.

WESLEY CHRISTY. [L. S.]

Witnesses:
M. T. ALLEN,
GEO. W. KREGER.